(12) United States Patent
Rodrigues et al.

(10) Patent No.: US 7,347,505 B2
(45) Date of Patent: Mar. 25, 2008

(54) FULL FLAT WHEEL

(75) Inventors: Flávio Rodrigues, Limeira (BR); Marco Antonio Ferraz Moreira, Limeira (BR); João Batista Tulimosky, Cordeiropolis (BR); Márcio Aparecido Oliveira, Limeira (BR); Paulo Celso de Assumpcão Sereno, Limeira (BR); Miguel Angelo Janieri, Limeira (BR); Evandro Luis Francischetti, Limeira (BR)

(73) Assignee: ArvinMeritor do Brasil Sistemas Automotivos, LTDA (BR)

( * ) Notice: Subject to any disclaimer, the term of this patent is extended or adjusted under 35 U.S.C. 154(b) by 126 days.

(21) Appl. No.: 11/092,378

(22) Filed: Mar. 29, 2005

(65) Prior Publication Data

US 2006/0220442 A1  Oct. 5, 2006

(51) Int. Cl.
B60B 3/10 (2006.01)
(52) U.S. Cl. .......................... 301/63.103; 301/63.104
(58) Field of Classification Search ..............................
301/63.103–63.105, 95.101, 95.104–95.106, 301/63.101, 63.106; 29/894.322
See application file for complete search history.

(56) References Cited

U.S. PATENT DOCUMENTS

| | | | |
|---|---|---|---|
| 4,610,482 A * | 9/1986 | Overbeck et al. | 301/63.105 |
| 5,257,455 A * | 11/1993 | Iwatsuki | 29/894.323 |
| 5,295,304 A | 3/1994 | Ashley | |
| 5,345,676 A | 9/1994 | Ashley | |
| 5,360,261 A | 11/1994 | Archibald | |
| 5,421,642 A | 6/1995 | Archibald | |
| 5,435,632 A | 7/1995 | Gajor | |
| 5,435,633 A | 7/1995 | Jaskiery | |
| 5,509,726 A | 4/1996 | Overbeck | |
| 5,551,151 A | 9/1996 | Overbeck | |
| 5,558,407 A | 9/1996 | Jaskiery | |
| 5,639,147 A | 6/1997 | Hill | |
| 5,651,590 A * | 7/1997 | Word | 301/64.201 |
| 5,803,553 A * | 9/1998 | Wei | 301/63.107 |
| 6,036,280 A * | 3/2000 | Stanavich | 301/63.103 |
| 6,052,901 A * | 4/2000 | Stegemann et al. | 29/894.324 |
| 6,170,918 B1 | 1/2001 | Archibald | |
| 6,193,321 B1 * | 2/2001 | Cvijanovic et al. | 301/63.107 |
| 6,240,638 B1 | 6/2001 | Archibald | |
| 6,354,667 B1 | 3/2002 | Cochran | |
| 6,370,777 B1 | 4/2002 | Heck | |
| 6,382,735 B2 | 5/2002 | Gonzalez | |
| 6,447,071 B1 | 9/2002 | Griffin | |
| 6,508,517 B2 * | 1/2003 | Mikami | 301/63.103 |

FOREIGN PATENT DOCUMENTS

GB   1 403 374   8/1975

* cited by examiner

*Primary Examiner*—Jason R. Bellinger
(74) *Attorney, Agent, or Firm*—Carlson, Gaskey & Olds

(57) ABSTRACT

A vehicle wheel assembly includes a wheel disc and a rim that are welded together. The wheel disc includes a full face disc portion with a disc lip extending in an inboard direction. The rim includes a main rim body with a rim lip that extends in an outboard direction, and which is in an overlapping relationship with the disc lip. The rim lip is defined by a smaller diameter than the disc lip such that the disc lip engages an outer peripheral surface of the rim lip. A weld is formed along a distal end of the disc lip to secure the wheel disc and rim together. This provides a vehicle wheel assembly that has a full, flat face, flangeless appearance.

18 Claims, 1 Drawing Sheet

FULL FLAT WHEEL

TECHNICAL FIELD

The subject invention relates to a vehicle wheel with a wheel disc and rim assembly providing a flangeless, flat face appearance.

BACKGROUND OF THE INVENTION

A wheel disc and a rim are welded together to form a wheel assembly that rotates about a wheel axis. The wheel disc includes a disc face portion that includes a bolted joint attachment interface for attachment to a rotating wheel structure, such as a wheel hub, for example. A flange portion extends radially outwardly from the disc face portion and a disc lip extends transversely relative to the flange portion in an outboard direction. The disc lip extends in a direction that is generally parallel to the wheel axis.

The rim includes a rim body with an outboard edge that abuts against the flange portion of the wheel disc to define an attachment interface. The rim body extends in a direction that is generally parallel to the wheel axis. A weld is applied at this attachment interface to secure the wheel disc and rim together. Thus, the weld extends along an inboard facing surface of the flange portion and along an outer peripheral surface of the rim body.

This traditional configuration has the flange portion extending radially outwardly beyond the attachment interface at the rim. In certain consumer markets, this visible flange portion is aesthetically unpleasing. Thus, there is a need to provide a wheel disc and rim assembly that eliminates this flange portion but which provides all of the structural benefits of the traditional design.

SUMMARY OF THE INVENTION

A vehicle wheel assembly includes a wheel disc and a rim that are welded together to provide a full face, generally flat and flangeless appearance for the vehicle wheel assembly. The wheel disc includes a full face disc portion and a disc lip that extends transversely relative to the full face disc portion. The rim includes a main rim body and a rim lip that is positioned in an overlapping relationship to the disc lip. A weld is applied along at least a portion of an interface between the rim lip and the disc lip to join the wheel disc and rim together to form the vehicle wheel assembly.

The vehicle wheel assembly is rotatable about a wheel axis of rotation. The full face disc portion extends radially about the wheel axis of rotation and has an outboard facing surface and an inboard facing surface. The disc lip extends transversely relative to the full face disc portion in an inboard direction away from the inboard facing surface. The rim lip overlaps the disc lip and extends in an outboard direction relative to the main rim body. The rim lip and the disc lip are both generally parallel to the wheel axis of rotation.

The disc lip is defined by an outer peripheral surface and an inner peripheral surface and the rim lip is defined by an outer peripheral surface and an inner peripheral surface. The outer peripheral surface of the disc lip is defined by a diameter that is greater than a diameter defining the outer peripheral surface of the rim lip. The outer peripheral surface of the rim lip is positioned to have direct contact with the inner peripheral surface of the disc lip.

In one example, one of the inner peripheral surface of the disc lip and the outer peripheral surface of the rim lip includes one of a groove and a rib. The other of the inner peripheral surface of the disc lip and the outer peripheral surface of the rim lip includes the remaining one of the groove and the rib. In either configuration, the rib is directly received within the groove to properly align and hold the wheel disc and the rim together.

By utilizing a wheel disc having a disc lip extending in an inboard direction, a vehicle wheel is provided that has a full flat face, flangeless, appearance. Further, by overlapping the disc lip with the rim lip, and welding at a joint interface between the disc lip and rim lip, a robust and structurally sound wheel assembly is provided. These and other features of the present invention can be best understood from the following specification and drawings, the following of which is a brief description.

DETAILED DESCRIPTION OF THE PREFERRED EMBODIMENT

Figure 1:
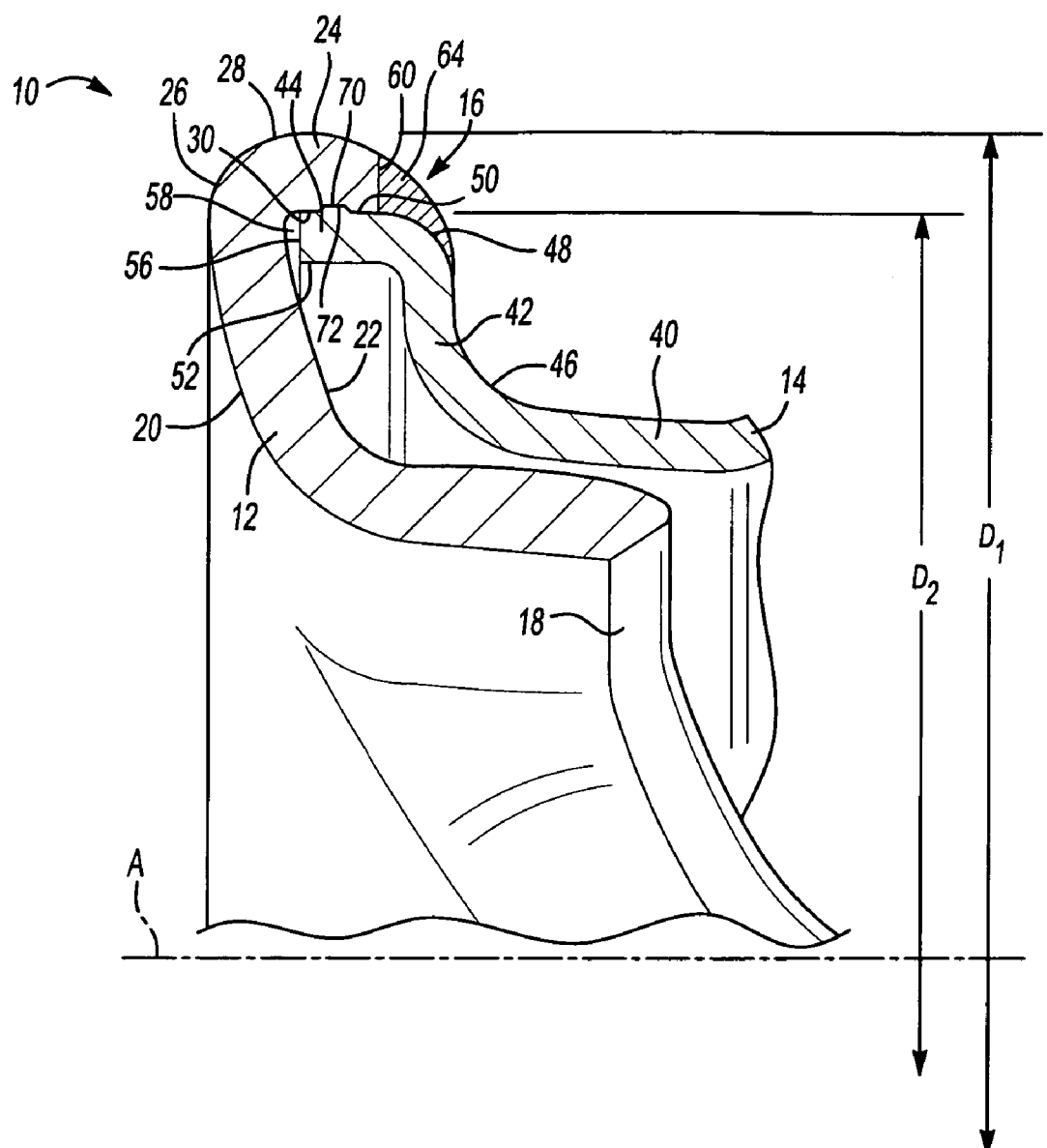
FIG. 1 shows a cross-sectional view of a wheel disc and rim joint interface incorporating the subject invention.

A vehicle wheel assembly is shown generally at 10 in FIG. 1. The vehicle wheel assembly 10 includes a wheel disc 12 and a rim 14 that are rotatable about a wheel axis A. As known, the wheel axis A extends generally in a lateral direction that is transverse to a longitudinal direction defined by a vehicle longitudinal axis.

The wheel disc 12 and the rim 14 are welded together at an attachment interface 16 to form the vehicle wheel assembly 10. It should be understood that while FIG. 1 shows only an outboard attachment interface between the wheel disc 12 and rim 14, an inboard attachment interface for the wheel disc 12 and rim 14 would be similar to attachment interface 16 as shown.

The wheel disc 12 includes a full face disc portion 18 that includes a joint interface (not shown) for attachment to a rotating wheel structure, such as a wheel hub, for example. The full face disc portion 18 includes an outboard facing surface 20 and an inboard facing surface 22. Both the outboard 20 and inboard 22 facing surfaces extend from a first radial distance from the wheel axis A to a second radial distance from the wheel axis A that is greater than the first radial distance. Both the outboard 20 and inboard 22 facing surfaces are surfaces that extend three-hundred and sixty degrees about the wheel axis A to form a generally circular disc.

It should be understood that terms such as "lateral," "longitudinal," "inboard," and "outboard" are relative terms that are well-known in the art. A lateral axis or lateral direction is generally defined as extending across a vehicle width and a longitudinal direction or axis is generally defined as extending along a vehicle length. An inboard direction is generally defined as a direction extending generally inwards, towards a vehicle center. An outboard direction is generally defined as a direction extending generally outwards from the vehicle center, i.e. away from a vehicle.

The wheel disc 12 also includes a disc lip 24 that extends transversely relative to an outer edge portion of the full face disc portion 18. The disc lip 24 extends generally in an inboard direction. A radiused portion 26 transitions from the full face disc portion 18 to the disc lip 24. A main component of the disc lip 24 extends inboard in a direction that is generally parallel to the wheel axis A. The disc lip 24 includes an outer peripheral surface 28 and an inner peripheral surface 30. The outer peripheral surface 28 is defined by a diameter that is greater than a diameter defining the inner peripheral surface 30.

The rim 14 includes a main rim body 40 that has a portion extending in a direction generally parallel to the wheel axis A. The rim 14 also includes a flange portion 42 that extends radially outwardly from one edge of the main rim body 40. A similar flange portion (not shown) would extend radially outboard from an opposite edge of the main rim body 40.

A rim lip 44 extends transversely relative to the flange portion 42 in an outboard direction. A main component of the rim lip 44 extends outboard in a direction that is generally parallel to the wheel axis A. A first radiused portion 46 transitions between the main rim body 40 and the flange portion 42 and a second radiused portion 48 transitions between the flange portion 42 and the rim lip 44. The rim lip 44 includes an outer peripheral surface 50 and an inner peripheral surface 52. The outer peripheral surface 50 is defined by a diameter that is greater than a diameter defining the inner peripheral surface 52.

The outer peripheral surface 28 of the disc lip 24 is defined by a diameter D1 that is greater than a diameter D2 defining the outer peripheral surface 50 of the rim lip 44. Accordingly, the inner peripheral surface 30 of the disc lip 24 is defined by a diameter that is greater than a diameter defining the inner peripheral surface 52 of the rim lip 44. Thus, the disc lip 24 overlaps on top of the rim lip 44, and the inner peripheral surface 30 of the disc lip 24 is in direct engagement with the outer peripheral surface 50 of the rim lip 44.

A distal end 56 of the rim lip 44 is axially spaced inboard from the inboard facing surface 22 of the full face disc portion 18, forming a gap 58. This gap 58 provides flexing clearance for the wheel disc 12.

A distal end 60 of the disc lip 24 is axially spaced outboard from the flange portion 42 of the rim 14. Further, the distal end 60 of the disc lip 24 is axially spaced outboard from the second radiused portion 48 such that a portion of the rim lip 44 is not overlapped by the disc lip 24. A weld bead 64 is formed at the distal end of the disc lip 24 and the outer peripheral surface 50 of the rim lip 44. The weld bead 64 touches, or extends along the distal end 60, a portion of the outer peripheral surface 50 of the rim lip 44, and a portion of the second radiused portion 48. The weld bead 64 is the only weld interface needed to attach the wheel disc 12 to the rim 14. The weld bead 64 can be a continuous weld bead or can be a plurality of discrete welds extending about the attachment interface 16.

In the example shown, the inner peripheral surface 30 of the disc lip 24 includes a groove 70 and the outer peripheral surface 50 of the rim lip 44 includes a tab or rib 72. The rib 72 is directly received within the groove 70 to properly align and hold the wheel disc 12 and rim 14 together. It should be understood that while the groove 70 is shown as being formed in the disc lip 24 and the rib 72 is shown as being formed in the rim lip 44, the reverse configuration could also be used. In this configuration, the rib 72 would be formed in the disc lip 24 and the groove 70 would be formed in the rim lip 44. The shape and profile of groove 70 and rib 72 could have many different configurations. The rib 72 and groove 70 cooperate with each other to align and hold the wheel disc 12 and rim 14 together.

The subject vehicle wheel assembly 10 eliminates a traditional flange structure by extending the disc lip 24 in an inboard direction to provide a wheel having a full, flat face, flangeless appearance. Further, by overlapping the disc lip 24 and the rim lip 44, and welding at the attachment interface 16 between the disc lip 24 and rim lip 44, a robust and structurally sound wheel assembly is provided. Further, with the unique configuration provided by the subject vehicle wheel assembly 10, steel wheels could be used to replace traditional aluminum wheels with a flanged appearance.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle wheel comprising:
   a wheel disc having a full face disc portion and a radiused portion that transitions directly from said full face disc portion into a disc lip extending inboard from said full face disc portion, and wherein said disc lip has a first outer peripheral surface and a first inner peripheral surface;
   a rim having a main rim body and a flange portion that transitions from said main rim body into a rim lip extending in an outboard direction toward said full face disc portion wherein said rim lip and said disc lip are positioned in an overlapping relationship, and wherein said rim lip has a second outer peripheral surface and a second inner peripheral surface, with said first inner peripheral surface directly engaging said second outer peripheral surface in an overlapping relationship such that said second inner peripheral surface does not contact said disc lip; and
   a weld provided at an interface between said disc lip and said rim lip to join said wheel disc and said rim together.

2. The vehicle wheel according to claim 1 wherein said second outer peripheral surface of said rim lip is defined by a first diameter and said first outer peripheral surface of said disc lip is defined by a second diameter that is greater than said first diameter.

3. The vehicle wheel according to claim 2 wherein said first inner peripheral surface includes one of a groove and a rib and said second outer peripheral surface includes the other of said groove and said rib, said rib being received within said groove.

4. The vehicle wheel according to claim 1 wherein said main rim body extends along a lateral axis and said flange portion extends radially outwardly from one edge of said main rim body in a direction transverse to said lateral axis and wherein said rim lip extends from said flange portion in the outboard direction generally along said lateral axis.

5. The vehicle wheel according to claim 4 wherein said rim includes a first radiused portion transitioning from said one edge of said main rim body to said flange portion and a second radiused portion transitioning from said flange portion to said rim lip.

6. The vehicle wheel according to claim 5 wherein a distal end of said disc lip is axially spaced outboard from said second radiused portion.

7. The vehicle wheel according to claim 6 wherein said weld is formed along said distal end of said disc lip, along said second outer peripheral surface of said rim lip, and along at least a portion of said second radiused portion.

8. The vehicle wheel according to claim 1 wherein said weld is only formed along a distal end of said disc lip and along said second outer peripheral surface of said rim lip.

9. A vehicle wheel comprising:
- a wheel disc having a full face disc portion and a disc lip extending transversely relative to said full face disc portion, said disc lip having an outer peripheral surface and an inner peripheral surface, said outer peripheral surface being defined by a first diameter that defines a maximum outer diameter of said wheel disc;
- a rim having a rim lip with an outer peripheral surface that is defined by a second diameter that is less than said first diameter wherein said rim lip and said disc lip are positioned in an overlapping relationship; and
- a weld provided at an interface between said disc lip and said rim lip to join said wheel disc and said rim together.

10. The vehicle wheel according to claim 9 wherein said wheel disc and said rim are rotatable about a wheel axis of rotation and wherein said disc lip and said rim lip are generally parallel to the wheel axis of rotation.

11. The vehicle wheel according to claim 10 wherein said rim includes a main rim portion extending along a direction generally parallel to the wheel axis of rotation and a flange portion extending radially outwardly from one edge of said main rim portion in a direction transverse to the wheel axis of rotation and wherein said rim lip extends from said flange portion in an outboard direction that is generally parallel to the wheel axis of rotation.

12. The vehicle wheel according to claim 11 wherein a distal end of said disc lip is spaced axially outboard of said flange portion of said rim.

13. The vehicle wheel according to claim 9 including a gap formed between a distal end of said rim lip and said full face disc portion.

14. The vehicle wheel according to claim 9 wherein an inner peripheral surface of said disc lip includes one of a groove and a rib and wherein an outer peripheral surface of said rim lip includes the other of the groove and the rib, said rib being directly received within said groove.

15. A vehicle wheel comprising:
- a wheel disc having a full face disc portion and a radiused portion that transitions directly from said full face disc portion into a disc lip extending inboard from said full face disc portion, and wherein said disc lip has an inner surface and outer surface, said outer surface defining a radially outermost diameter of said wheel disc;
- a rim having a main rim body and a flange portion that transitions from said main rim body into a rim lip extending in an outboard direction toward said full face disc portion wherein said rim lip and said disc lip are positioned in an overlapping relationship; and
- a weld provided at an interface between said disc lip and said rim lip to join said wheel disc and said run together.

16. A vehicle wheel comprising:
- a wheel disc having a full face disc portion and a radiused portion that transitions directly from said full face disc portion into a disc lip extending inboard from said full face disc portion, and wherein said radiused portion of said wheel disc first extends upwardly from said full face disc portion in a direction away from a wheel axis of rotation and then extends inwardly in a direction generally along the wheel axis of rotation to form a curved surface that extends from said full face disc portion to said disc lip;
- a rim having a main rim body and a flange portion that transitions from said main rim body into a rim lip extending in an outboard direction toward said full face disc portion wherein said rim lip and said disc lip are positioned in an overlapping relationship; and
- a weld provided at an interface between said disc lip and said rim lip to join said wheel disc and said rim together.

17. The vehicle wheel according to claim 9 wherein said wheel disc includes a radiused portion that transitions directly from said full face disc portion into said disc lip, and wherein said rim includes a main rim body and a flange portion that transitions from said main rim body into said rim lip, said rim lip extending in an outboard direction toward said full face disc portion, and said disc lip being overlaid on top of said rim lip such that an inner peripheral surface of said rim lip does not contact said wheel disc.

18. The vehicle wheel according to claim 17 wherein said radiused portion of said wheel disc first extends upwardly from said full face disc portion in a direction away from a wheel axis of rotation and then extends inwardly in a direction generally along the wheel axis of rotation to form a curved surface that extends from said full face disc portion to said disc lip, and wherein said main rim body extends in a direction generally along the wheel axis of rotation and transitions into said flange portion which extends radially outwardly from the wheel axis of rotation, with said flange portion transitioning into said run lip which extends in a direction generally along the wheel axis of rotation.

* * * * *

UNITED STATES PATENT AND TRADEMARK OFFICE
CERTIFICATE OF CORRECTION

PATENT NO. : 7,347,505 B2 Page 1 of 1
APPLICATION NO. : 11/092378
DATED : March 25, 2008
INVENTOR(S) : Rodrigues et al.

It is certified that error appears in the above-identified patent and that said Letters Patent is hereby corrected as shown below:

Claim 15, Column 6, line 4: "run" should read as --rim--

Signed and Sealed this

Eighth Day of July, 2008

JON W. DUDAS
*Director of the United States Patent and Trademark Office*